United States Patent [19]

Ogawa et al.

[11] 3,749,385
[45] July 31, 1973

[54] CUTTER FOR WIDE FLAT BARS

[75] Inventors: Kiichi Ogawa; Setsuo Shoji; Tomoyoshi Sukegawa, all of Yokohama, Kanagawa-ken, Japan

[73] Assignee: Nippon Kokan Kabushiki Kaisha, Kanagawa-ken, Japan

[22] Filed: Nov. 10, 1970

[21] Appl. No.: 88,278

[30] Foreign Application Priority Data
Nov. 17, 1969 Japan.................................. 44/91609

[52] U.S. Cl................ 266/23 B, 83/281, 214/8.5 F, 266/23 R
[51] Int. Cl............................................... B23k 7/02
[58] Field of Search............... 266/23 B, 23 E, 23 R; 83/281, 280, 417; 214/8.5 F

[56] References Cited
UNITED STATES PATENTS
1,981,117  11/1934  Oakley.......................... 266/23 E X
3,244,047  4/1966   Daniluk.......................... 83/280 UX
3,279,791  10/1966  Fisher................................ 83/281 X
3,526,395  9/1970   Brown........................... 266/23 B X
2,072,667  3/1937   Coe............................... 214/8.5 F X FOREIGN PATENTS OR APPLICATIONS
80,730  3/1956  Denmark........................... 266/23

Primary Examiner—Robert D. Baldwin
Attorney—Flynn and Frishauf

[57] ABSTRACT

An automatic line cutter for wide flat bars comprises a stand for supporting flat bars, a cutting station, a flat bar feeding apparatus for feeding bars to a conveyor line which carries flat bars to a guidable cutter torch located at the cutting stand. A dropping stand is provided for delivering the finished cut product.

8 Claims, 5 Drawing Figures

CUTTER FOR WIDE FLAT BARS

The present invention relates to a cutter for flat metal members which may serve as reenforcing members for use in the construction of ship hulls.

In the construction of ship hulls, reenforcing members of various shapes are used. Where comparatively low strength is adequate these reenforcing members may be flat and are then either cut out of wide sheets or out of material marketed commonly as flat bars.

Up to date, these members have been cut manually out of marked flat bars, the operations necessarily and unavoidably being inefficient, and the products not being precisely finished and uniform in quality.

The present invention provides an efficient automatic cutter for cutting out flat metal members of different shapes.

SUMMARY OF THE INVENTION

According to the present invention there is provided apparatus for cutting wide flat bars comprising a stand for supporting workpieces in the form of wide flat bars, means for feeding flat bars at least one at a time from the stand onto a conveyor, said conveyor being arranged to carry a flat bar thereon to a cutting stand at a cutting station, at least one automatically guidable cutter means at the cutting station positioned so as to be able to cut a flat bar located on the cutting stand, and means for delivering cut flat bars from the cutting stand.

In order that the invention may be more clearly understood, an embodiment thereof will now be described, by way of example, with reference to the accompanying drawings, in which.

Figure 2:
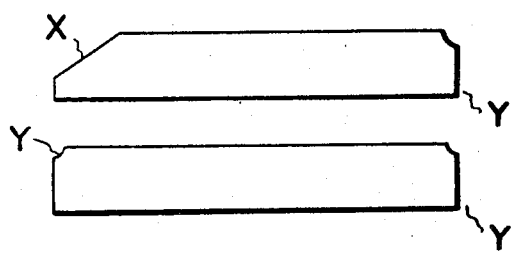
FIG. 2 is a diagrammatic plan view of cutting apparatus according to the present invention.

In FIG. 2, a and a' represent means for feeding flat bars 22, b a stand for flat bars fed thereto, c a conveyor line for flat bars taken from the stand, e a cutting tool and f a cutting and drop stand.

Figure 3:
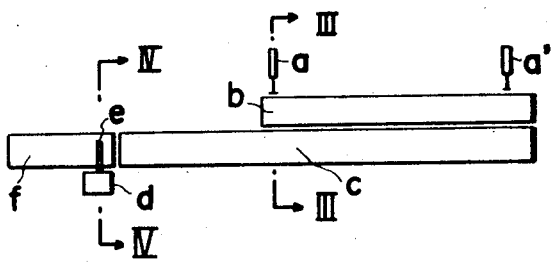
FIG. 3 is a cross-sectional view taken along the line III—III of FIG. 2.

Referring to FIG. 3, the stand b comprises a table 2 for supporting the flat bars and a hydraulic cylinder 5 by which the table can be raised and lowered. In this embodiment, flat bars are piled on the table 2 in two stacks. Each of the feeding apparatuses a, a' is provided with pivotally connected feeder rods 1a, 1b. Rods 1b each mounted on a pivot pin 6 and each rod 1a, 1b has a hook or claw 7 at the lower side thereof. Pivot pin 6 is mounted on the output shaft of a hydraulic cylinder 1, and as the shaft is pushed forwardly, the feeder rod 1a catches with its hook 7 the top flat bar in the left hand stack (as viewed in FIG. 3) and the feeder rod 1b likewise catches the top flat bar on the right hand stack. As the movement continues, these two flat bars are fed sideways onto the rollers 3 of the conveyor line c.

Both flat bars will be positioned at a predetermined position transversely of the rollers 3 by a centering stop 4 which stops the movement of the right hand flat bar and hence of the feeding bars at a predetermined point. The feeding bars 1a and 1b are then retracted by cylinder 1. Every time flat bars have been fed onto the feeder rollers 3, the stand cylinder 5 is operated to raise the uppermost flat bars of the stacks to a feeding position.

The flat bar 22, once fed onto the rollers 3 of the conveyor line c, are then either automatically or manually conveyed thereon to the cutter stand f until their ends come into contact with an end stop 13 which serves to determine the length of the members which are to be cut from the flat bars 22, as will become apparent. See FIGS. 4 and 5. The bars are then simultanteously cut across by the cutting tool having two torch heads 24. In more detail, the flat bars 22 are transferred from the feed rollers 3 to cutter stand rollers 9 as they approach the size determining stop 13. Stop 13 is mounted on running means 15 (see FIG. 4) which runs on rails 10, situated to each side of the cutter stand rollers 9, by means of wheels 15d. Reference 15a denotes a handle used for positioning the running means 15. A gear 15b is provided at the end of the handle shaft, and this engages with a rack 15c on the running means, whereby the running means can be moved along its rails 10.

Once the flat bars have been positioned longitudinally by the stop 13 they are cut by the torches 24, guided by a magnet type cutter guide. A torch holder 24a supports the torches 24 and is in turn mounted on a stand 25 which is movable on wheels transversely relative to the flat bars. The wheels run on a stand 26 which is in turn movable lengthwise of the flat bars. Thus, the torch holder 24a may be moved both along the width and length of the flat bars.

Figure 1:
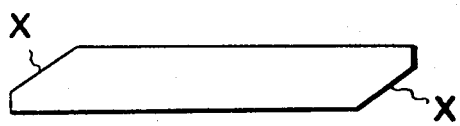
FIG. 1 is a plan view showing three shapes of flat metal members which may be cut out using apparatus according to the present invention.

A rotatable magnet, i.e. roller 19 is mounted atop the stand 25. The magnet roller 19 is movable within a guide slot 27 in a guide plate 18 mounted in a guide stand 16. As the roller 19 is driven rotatably along one edge of the guide slot, so the stand 25 moves on a path corresponding to the shape of the slot, and hence the torches 24 follow similar paths across the flat bars 22, cutting across them on a line determined by the form of the slot, as illustrated in broken lines in FIG. 5. The guide plate 18 is shown as including two parts A, B respectively provided with two different shapes of guide slots; A being used for cutting the end of a member into the shape shown at Y in FIG. 1 and B being used for cutting an end in the shape X of FIG. 1.

Figure 5:
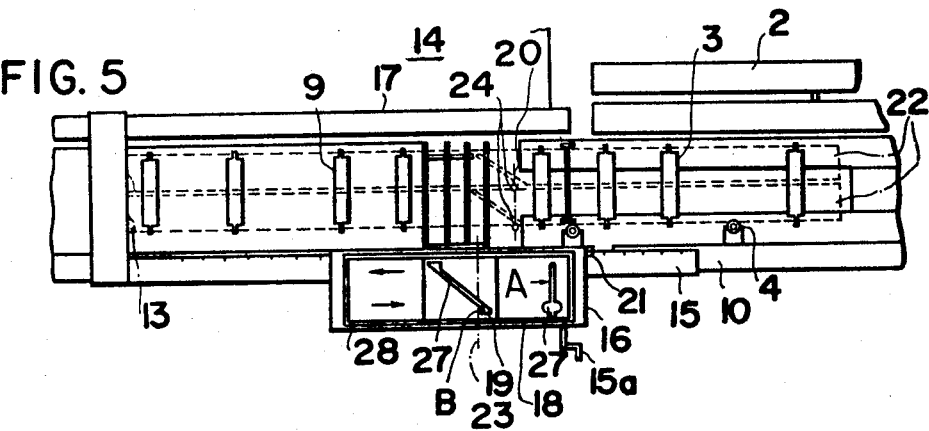
FIG. 5 is a plan view of part of the apparatus shown in FIGS. 2-4.

As shown in FIG. 5, the guide plate 18 is slidable in a window 28 of the stand 16 so that part A or part B of the guide plate can be brought to the central position in window 28 and the magnet, i.e. roller 19 can be inserted in the respective slot 27. Reference 23 denotes the guide line for starting cutting. As is shown in the drawings, the window 28 is three times as wide as part A or part B of the guide plate 18 so that either part A or part B can be centrally positioned. Parts A and B can be placed upside down in stand 18 to reverse the shape of the cutting line if desired.

Reference 21 shows an indicating board for cut product sizes.

Figure 4:
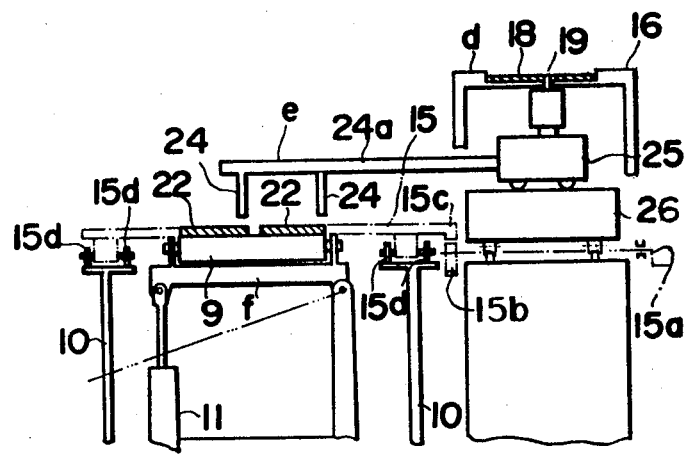
FIG. 4 is a cross-sectional view taken along the line IV—IV of FIG. 2.

A hydraulic cylinder 11 at one side of the cutter stand f is operated after the flat bars are cut, so as to tilt the cutter stand into a position as shown by the chain line in FIG. 4 so that the cut flat bars on the rollers 9 slide down over a guide plate 17 onto a pallet (not fully shown) in position 14 for receiving the finished goods and for transferring them elsewhere.

Two shapes of guide slots are sufficient for most purposes. In the exemplary embodiment described, two cutter torches are automatically guided simultaneously to complete one cycle of an operation, so that two sheets or bars are cut in one operation. A single torch, or more than two could, of course, be used.

Instead of defining the cutting line physically as a guide slot, it could, of course, be represented digitally and fed to a suitable actuator for the cutting mechanism. The present invention eliminates marking operations and automates the operation, and this may improve the work efficiency by up to four times than that of conventional operations. The finished products are uniform and excellent in quality.

What is claimed is:

1. Apparatus for cutting wide flat bars, which bars may be of variable length, comprising:
    a supporting stand adapted to support at least two adjacent stacks of workpieces which are in the form of wide flat bars;
    a conveyor adjacent said supporting stand, said conveyor being adapted to convey flat bars in a given conveying direction;
    a cutting station including a cutting stand;
    means for feeding said flat bars at least one at a time from each of said stacks on said supporting stand onto said conveyor, said conveyor carrying flat bars thereon in said given conveying direction to said cutting stand at said cutting station, said feeding means including:
        feeder rods, each of said feeder rods comprising first and second pivotally connected members, and each of said first and second members including an engaging hook on its lower side for engaging a flat bar from one of said stacks;
        means for driving said feeder rods in a direction substantially transverse to said given conveying direction of said conveyor and across said stacks of flat bars on said supporting stand, each of said pivotally connected members of said feeder rods being mounted to engage and slideably feed the respective uppermost flat bars from said at least two stacks on said supporting stand in said substantially transverse direction to said conveyor and for then retracting said rods over said at least two stacks thereby feeding two bars to said conveyor substantially simultaneously; and
        means for raising said supporting stand after feeding of said uppermost flat bars from said at least two stacks so that the next uppermost flat bars are in position to be fed to said conveyor by said feeder rods;
    at least one automatically guidable cutter means at said cutting station for cutting a flat bar located on said cutting stand; and
    means for delivering cut flat bars from the cutting stand.

2. Apparatus according to claim 1 wherein said cutter means is movable lengthwise and widthwise relative to a flat bar on said cutting stand; and including guide means for physically guiding said cutter means.

3. Apparatus according to claim 2 wherein said guide means includes a slot shaped to correspond to the finished shape of a cut to be made in the bar, and a magnet roller engaging with said slot for guiding said cutter means.

4. Apparatus according to claim 1 comprising a stop for flat bars carried to said cutting stand, which stop is movable relative to said cutting stand in the longitudinal direction of a bar on said cutting stand, thereby enabling adjustment of the longitudinal position at which the bar is cut.

5. Apparatus according to claim 1 wherein said at least one cutter means includes at least one cutter torch.

6. Apparatus according to claim 1 wherein said first feeder rod member is fixedly connected to said driving means and wherein said second feeder rod member is pivotally connected to said first feeder rod member.

7. Apparatus according to claim 1 wherein said supporting stand includes means adapted to receive said stacks with said at least two stacks of workpieces aligned next to each other in a direction transverse to said given conveying direction of said conveyor such that said feeder rods feed the uppermost flat bar from the stack adjacent said conveyor directly onto said conveyor, and feed the uppermost flat bar from the stack remote from said conveyor over said stack which is adjacent said conveyor and then onto said conveyor, the uppermost flat bars from said stacks being located adjacent to each other on said conveyor.

8. Apparatus according to claim 1 wherein said conveyor is a roller conveyor having rotatable rollers, said flat bars being fed to said conveyor in a direction transverse to the direction of rotation of the rollers of said roller conveyor.

* * * * *